May 7, 1929.  F. W. ERICKSON  1,711,995
THREADLESS CONDUIT FITTING
Filed Nov. 14, 1927
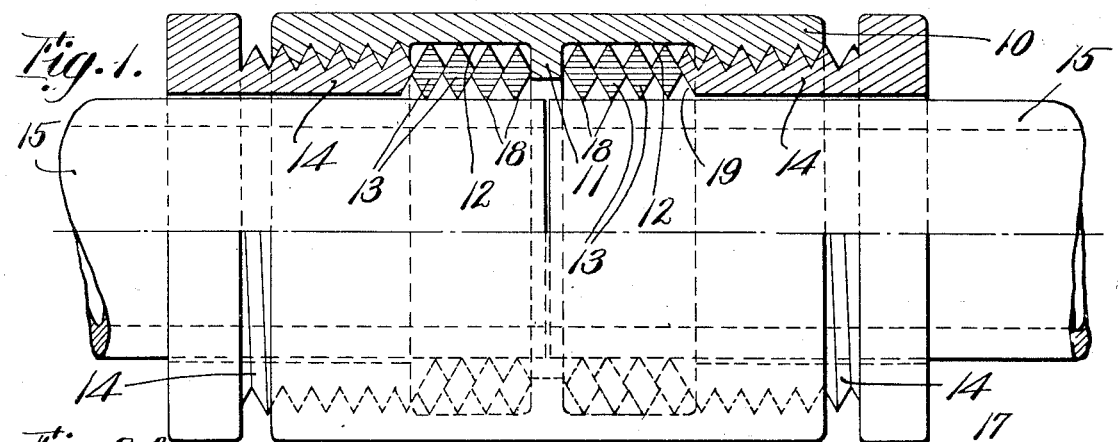
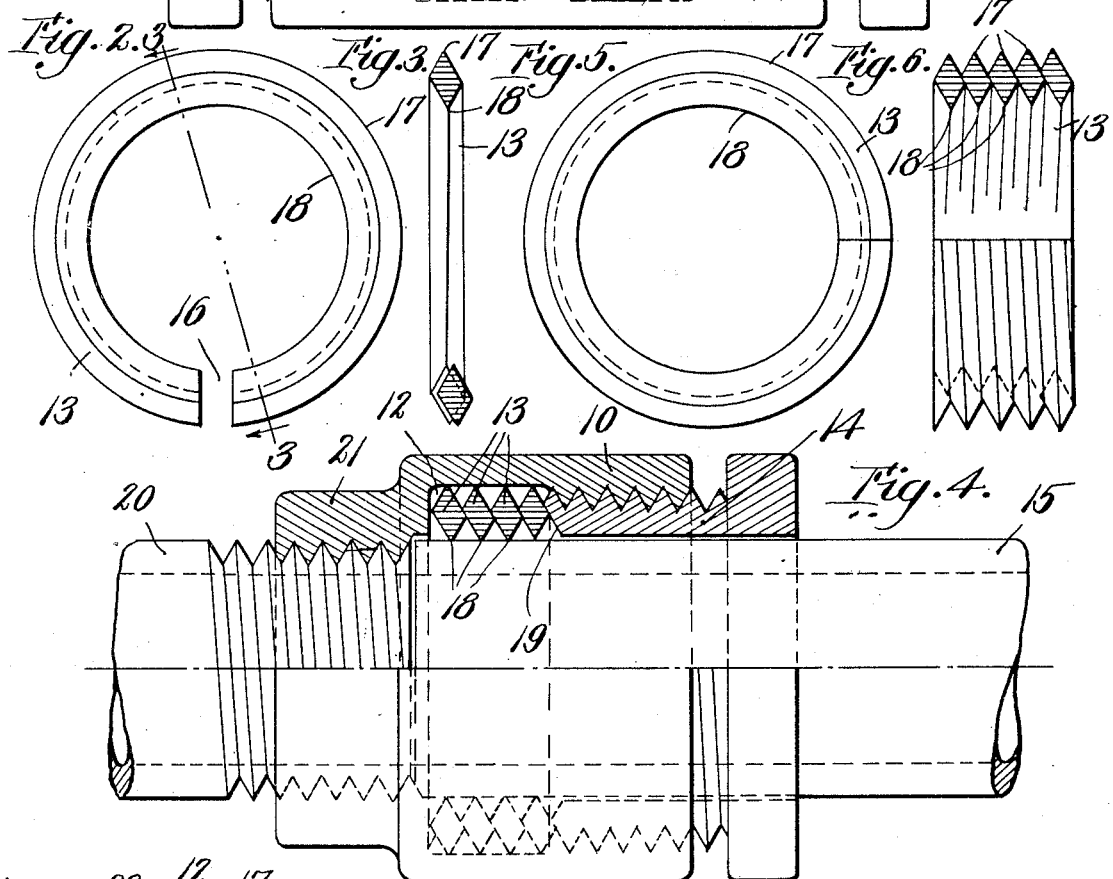
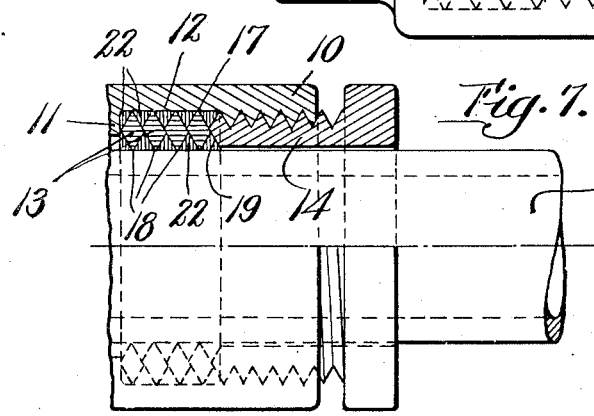
Inventor:
Frederic W. Erickson
by A. W. Harrison Atty.

Patented May 7, 1929.

1,711,995

UNITED STATES PATENT OFFICE.

FREDERIC W. ERICKSON, OF LARCHMONT, NEW YORK.

THREADLESS CONDUIT FITTING.

Application filed November 14, 1927. Serial No. 233,054.

This invention relates to means for coupling together the ends of conduits commonly used for encasing electric wires, and also for connecting conduits to outlet boxes and other terminal devices which form parts of electric conduit systems.

The most common practice heretofore has been to couple pipes by means of fittings having standard threads, the pipes being cut and threaded where the joints are to be made, by means of cutting dies.

In the installation of conduits for the protection of electric wires, a mechanically strong coupling is required, and one that gives continuity of metal to metal contact so that the entire system may be permanently and effectively connected. The joints are not required to withstand an internal pressure.

One of the objects of my invention is to provide a coupling which effects a saving in the cost of labor in making up the joints of conduits.

Another object is to provide a practical coupling which eliminates the necessity of threads at the ends of the conduits, which threads materially decrease the diameters of the ends of the conduits.

Another object is to provide a practical coupling which can be disconnected at any joint after installation without destroying the coupling.

With the above and other objects hereinafter explained, the invention consists in the construction and combination of the parts of the coupling substantially as hereinafter described and claimed.

Of the accompanying drawings:

Figure 1 represents a complete assembly, partly in side elevation and partly in longitudinal section.

Figure 2 is a side elevation of one of the washer members.

Figure 3 represents a section on line 3—3 of Figure 2.

Figure 4 is a view similar to Figure 1 but illustrating a structure for connecting an unthreaded conduit to a threaded member.

Figure 5 is a side elevation of a washer member in the form of a coil.

Figure 6 is a partial side elevation and partial longitudinal section of the washer member shown in Figure 5.

Figure 7 is a view similar to a portion of Figure 1 and illustrating packing which is preferably employed.

Similar reference characters indicate similar parts or features in all of the views.

Referring first to Figure 1, the sleeve 10 is formed with an internal rib 11 at about its mid-length and is internally threaded at its ends and is provided with an annular internal recess forming a chamber 12 each side of the rib 11. The two chambers contain helically formed washers 13 of hardened steel or equivalent material.

Engaging each internally threaded end of the sleeve 10 is a bushing 14 the outer end of which is, of course, preferably formed to be engaged by a wrench for forcibly rotating it.

The conduit pipes 15, which are usually of mild steel, are threadless and smoothly fit the internal bores of the bushings 14, and meet end to end, preferably at a point inside the rib 11 of the sleeve.

The washers 13 are substantially rectangular in cross section and are of helical formation to enable them to be inserted into the chambers 12 by engaging them with the internal threads of the sleeve and rotating them so that they will have a screwing-in motion until they arrive in said chambers. In other words, the washers are of a shape corresponding with the pitch of the internal threads of the sleeve 10. In the form illustrated by Figures 2 and 3, each washer 13 is ring-shaped and has an opening 16 and is helically shaped whereby its insertion to place as just described is facilitated. But instead of employing a requisite number of single ring-coils as illustrated by Figures 2 and 3, they may be in continuous form, as illustrated by Figures 5 and 6.

Whether a group or series of single ring-coils is employed in each chamber 12, or a continuous coil, the washers are so formed that when they are to be inserted in a chamber their outer edges 17 will, when the washers are rotated, readily follow the internal threads of the sleeve 10 and leave said threads upon entering the chamber. The inner edges of the washers which are to bite into a conduit are indicated at 18.

The inner end 19 of each bushing 14 is countersunk to present an internal inclined surface so that, when the parts are assembled as illustrated by Figure 1, and the bushings are screwed in, each countersink 19 acts on the outer inclined side face of the first washer member to contract that member, and the pressure transmitted through the other members toward the stop wall or rib 11 causes each member to act similarly on the other members so that all are contracted with the result that the sharp inner edges of the washer members bite into the conduit pipe or pipes 15.

Figure 4 illustrates the invention in a form for connecting a threadless conduit pipe 15 with the threaded end of a standard conduit pipe 20. The sleeve 10 for this form is substantially the same as in Figure 1 except that it has but one chamber 12 and has one end 21 which is smaller and internally threaded to correspond with the threads of the pipe 20.

Figure 7 illustrates a structure similar to what has been described, with the addition of a feature which is important when it is desired to prevent the leakage of water. It consists in providing a tight packing, of ductile metal such as lead, which is cast around the hardened steel rings or helixes 13. Then when the bushing 14 is screwed into the sleeve, contracting the washers 13, the ductile metal will be forced out of its original position and against the walls of the chamber 12 and against the conduit pipe, thereby making a tight packing sufficient to prevent the leakage of water into the conduits. It is to be understood, of course, that such packing, which is illustrated at 22 in Figure 7, will usually be employed in couplings such as illustrated by Figures 1 and 4 unless, for some reasons, such packing is not needed in the particular installations that are being constructed.

When the members are assembled as illustrated and described, there are several biting edges 18 which so engage the conduits or either of them that an exceedingly effective grip is maintained. There being a plurality of the binding washers confined in a chamber, the result is that the more strain is put on the conduits to pull them apart, from the coupling, the tighter the washers will grip the conduits. This is important in the installations of conduits vertically where the joints must be mechanically secured to sustain great weights safely.

A further advantage is that the helical form of the steel washers causes them to be confined like springs between the inner ends of the bushings and the rib 11, Figure 1, or the equivalent thereof in Figure 4, so that no amount of vibration, when installed, can loosen them or cause any rattling noises.

Having now described my invention, I claim:—

1. A conduit coupling comprising a sleeve having an internal chamber and threads leading to said chamber, hard metal contractible washer members in said chamber, said members being formed to correspond with the pitch of the said threads of the sleeve and having oppositely inclined side faces and sharp inner edges and having their inclined faces contacting with each other, and an externally threaded bushing cooperating with the threads of the sleeve to contract the washer members and force their sharp inner edges into contact with a conduit extending into the coupling.

2. A conduit coupling comprising a sleeve having an internal chamber and threads leading to said chamber, hard metal washers in said chamber, said washers being normally of screw form and having oppositely inclined side faces and sharp inner edges, and an externally threaded bushing cooperating with the threads of the sleeve to compress the washers and force their sharp inner edges into contact with a conduit extending into the coupling.

3. A conduit coupling comprising a sleeve having an internal chamber, a helically formed washer of hard metal in said chamber, said washer having sharp-edged inner portions and inclined side faces, and means for effecting endwise pressure on said faces of the washer.

4. A conduit coupling comprising a sleeve having an internal chamber, a plurality of hard metal washer members in said chamber, said members having sharp inner edges and inclined side faces, ductile metal in the spaces between said members, and means for compressing said members and ductile metal laterally.

5. A conduit coupling comprising a sleeve internally threaded at its ends and having an internal rib at a point intermediate its ends and having a chamber each side of said rib, externally threaded bushings having countersunk inner ends, and helically formed washer members of hard metal in said chambers, said washer members having contacting inclined side faces and sharp inner edges.

6. A conduit coupling comprising a sleeve having an internal chamber, a plurality of helically formed hard metal distortible washer members in contact with each other in said chamber, said members having sharp inner edges, and means for forcing said members against each other to effect decrease of the internal diameters of the said members.

In testimony whereof I have affixed my signature.

FREDERIC W. ERICKSON.